(12) United States Patent
Ohnuma et al.

(10) Patent No.: US 7,881,346 B2
(45) Date of Patent: Feb. 1, 2011

(54) METHOD AND APPARATUS FOR TRANSMITTING TERRESTRIAL DIGITAL SIGNAL

(75) Inventors: Kazuhiro Ohnuma, Kawasaki (JP); Masanori Kondo, Kawasaki (JP); Toshihiro Ban, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 930 days.

(21) Appl. No.: 11/159,313

(22) Filed: Jun. 23, 2005

(65) Prior Publication Data

US 2006/0182053 A1 Aug. 17, 2006

(30) Foreign Application Priority Data

Feb. 14, 2005 (JP) ............................. 2005-036630

(51) Int. Cl.
*H04J 3/06* (2006.01)
(52) U.S. Cl. ....................................... 370/509; 370/503
(58) Field of Classification Search ................. 370/205, 370/213, 345, 350, 503–520, 395.62
See application file for complete search history.

(56) References Cited

U.S. PATENT DOCUMENTS

| | | | | |
|---|---|---|---|---|
| 6,111,878 | A * | 8/2000 | Powell | 370/395.62 |
| 6,222,848 | B1 * | 4/2001 | Hayward et al. | 370/412 |
| 6,438,143 | B1 | 8/2002 | Higashida | |
| 6,807,180 | B1 * | 10/2004 | Restivo | 370/395.62 |
| 2003/0237041 | A1 * | 12/2003 | Cole et al. | 714/776 |
| 2005/0047341 | A1 * | 3/2005 | Kim et al. | 370/232 |
| 2005/0117608 | A1 * | 6/2005 | Karakawa et al. | 370/486 |

FOREIGN PATENT DOCUMENTS

| | | |
|---|---|---|
| JP | 05-219038 A | 8/1993 |
| JP | 05-244107 A | 9/1993 |
| JP | 05-244113 A | 9/1993 |
| JP | 11-112938 A | 4/1999 |
| JP | 2000-115263 | 4/2000 |
| JP | 2001-103502 A | 4/2001 |
| JP | 2004-221952 A | 8/2004 |

OTHER PUBLICATIONS

NEC Technical Journal vol. 57, No. Apr. 2004, pp. 49-54, "Digital Terrestrial Television Transmitter System in Tokyo Tower" with English Abstract.
Japan Patent Office; Decision of a Patent Grant, mailed Aug. 10, 2010, in connection with correspondent JP application No. 20050-036630. English-language translation provided.

* cited by examiner

*Primary Examiner*—Kwang B Yao
*Assistant Examiner*—Kenan Cehic
(74) *Attorney, Agent, or Firm*—Fujitsu Patent Center

(57) ABSTRACT

An apparatus for transmitting terrestrial digital data using a synchronous-optical-network system or a synchronous-digital-hierarchy system includes a synchronous-difference calculating unit that calculates a synchronous difference between a standard signal used in the synchronous-optical-network system or the synchronous-digital-hierarchy system and a first synchronous signal that synchronizes with a leading position included in image data of the terrestrial digital data; and a transmission processing unit that transmits the synchronous difference together with the terrestrial digital data to a destination.

10 Claims, 9 Drawing Sheets

METHOD AND APPARATUS FOR TRANSMITTING TERRESTRIAL DIGITAL SIGNAL

BACKGROUND OF THE INVENTION

1. Field of the Invention

The present invention relates to a technology for transmitting a signal for a terrestrial digital broadcasting using synchronous optical network (SONET)/synchronous digital hierarchy (SDH) communication system.

2. Description of the Related Art

To improve image quality and to achieve advanced features in television, terrestrial digital broadcasting services are being offered. Specifically, terrestrial television broadcasting is digitalized, and then transmitted from towers on the ground (such as Tokyo Tower) to broadcast stations.

The mainstream method of transmitting signals of terrestrial digital broadcasting is the wireless signal transmission method (refer to "Digital Terrestrial Television Transmitter System in Tokyo Tower", Tomohito Ikegami et al., NEC Giho Vol. 57, No.4/2004, pp. 49-54).

However, because wireless transmission is used for various purposes other than terrestrial digital broadcasting, many frequencies are competing with each other. Thus, there is a strong demand to transmit signals of terrestrial digital broadcasting by using fixed cables.

However, it is very difficult to transmit signals of terrestrial digital broadcasting by using fixed cables, because it entails many advanced specifications of interfaces between devices. Thus, none of the broadcast stations have realistic plans to implement cable signal transmission.

One approach is to build new cables dedicated for terrestrial digital broadcasting, connecting the broadcast stations. However, this is unfeasible because enormous costs are required.

It is therefore imperative to use existing general-purpose lines so that broadcast stations can realize cable signal transmission for terrestrial digital broadcasting without difficulty.

SUMMARY OF THE INVENTION

It is an object of the present invention to at least solve the problems in the conventional technology.

An apparatus according to one aspect of the present invention, which is for transmitting terrestrial digital data using a synchronous-optical-network system or a synchronous-digital-hierarchy system, includes a synchronous-difference calculating unit that calculates a synchronous difference between a standard signal used in the synchronous-optical-network system or the synchronous-digital-hierarchy system and a first synchronous signal that synchronizes with a leading position included in image data of the terrestrial digital data; and a transmission processing unit that transmits the synchronous difference together with the terrestrial digital data to a destination.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be described-below with reference to accompanying drawings. The present invention is not limited to these embodiments.

A transmitter according to the present invention functions as a source transmitter and a destination transmitter. The source transmitter calculates differences between standard synchronous signals in the SONET/SDH communication system, and signals of terrestrial digital broadcasting (hereinafter, "terrestrial digital broadcasting signals"). The calculated differences and the terrestrial digital broadcasting signals are stored in a frame (such as a SONET/SDH frame), and the frame is transmitted to the destination transmitter.

The destination transmitter that receives the frame reproduces signals equivalent to the terrestrial digital broadcasting signals of the source transmitter, based on the differences and the terrestrial digital broadcasting signals stored in the frame.

Figure 1:
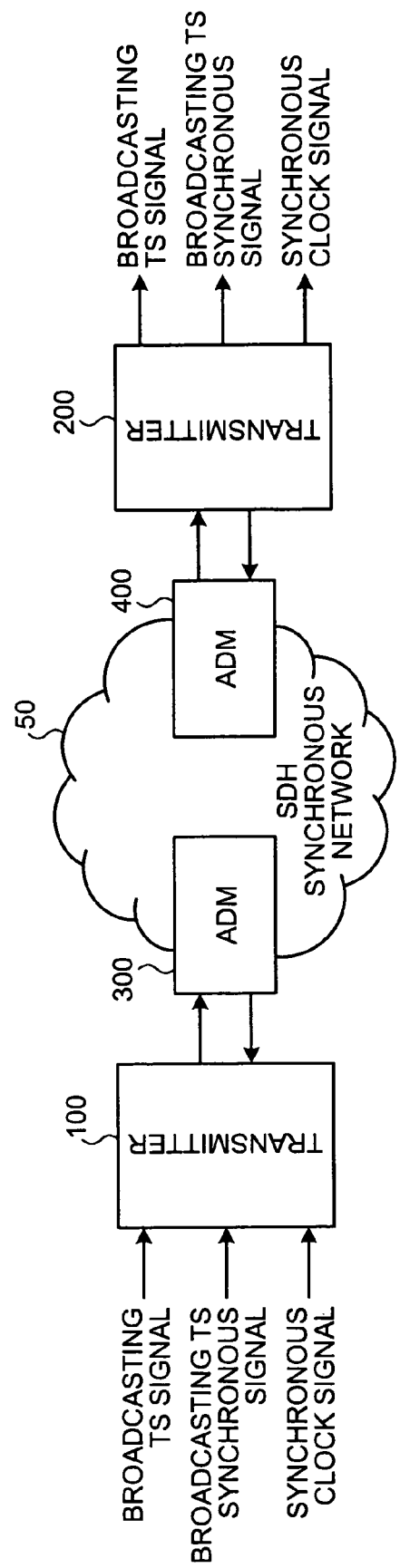
FIG. 1 is a block diagram of a transmitting system according to an embodiment of-the present invention.

FIG. 1 is a block diagram of a transmitting system according to an embodiment of the present invention. In the transmitting system, a transmitter 100 and a transmitter 200 are connected to an add/drop multiplexer (ADM) 300 and an ADM 400, respectively. The ADM 300 and the ADM 400 are connected through an SDH synchronous network 50.

The transmitter 100 calculates the differences between the terrestrial digital broadcasting signals and the standard synchronous signals, and transmits the calculated differences and the terrestrial digital broadcasting signals to the transmitter 200. When data is received from the transmitter 100, the transmitter 200 reproduces signals equivalent to the terrestrial digital broadcasting signals that the transmitter 100 acquired, based on the differences and the terrestrial digital broadcasting signals received.

The terrestrial digital broadcasting signals include broadcasting transport stream (TS) signals, broadcasting TS synchronous signals, and synchronous clock signals. The broadcasting TS signals are image data signals of terrestrial digital broadcasting, the broadcasting TS synchronous signals are signals that synchronize with a starting point in each image data in the broadcasting TS signals, and the synchronous clock signals are used when the destination transmitter receives and reproduces terrestrial digital broadcasting signals.

The ADM 300 acquires data from the transmitter 100 and stores the data in a frame. The ADM 300 then transmits the frame to the ADM 400 through the SDH synchronous network 50. When the ADM 300 acquires a frame, the ADM 300 extracts data in the acquired frame, and passes the extracted data to the transmitter 100. The ADM 300 also passes standard synchronous data received from outside to the transmitter 100.

Figure 2:
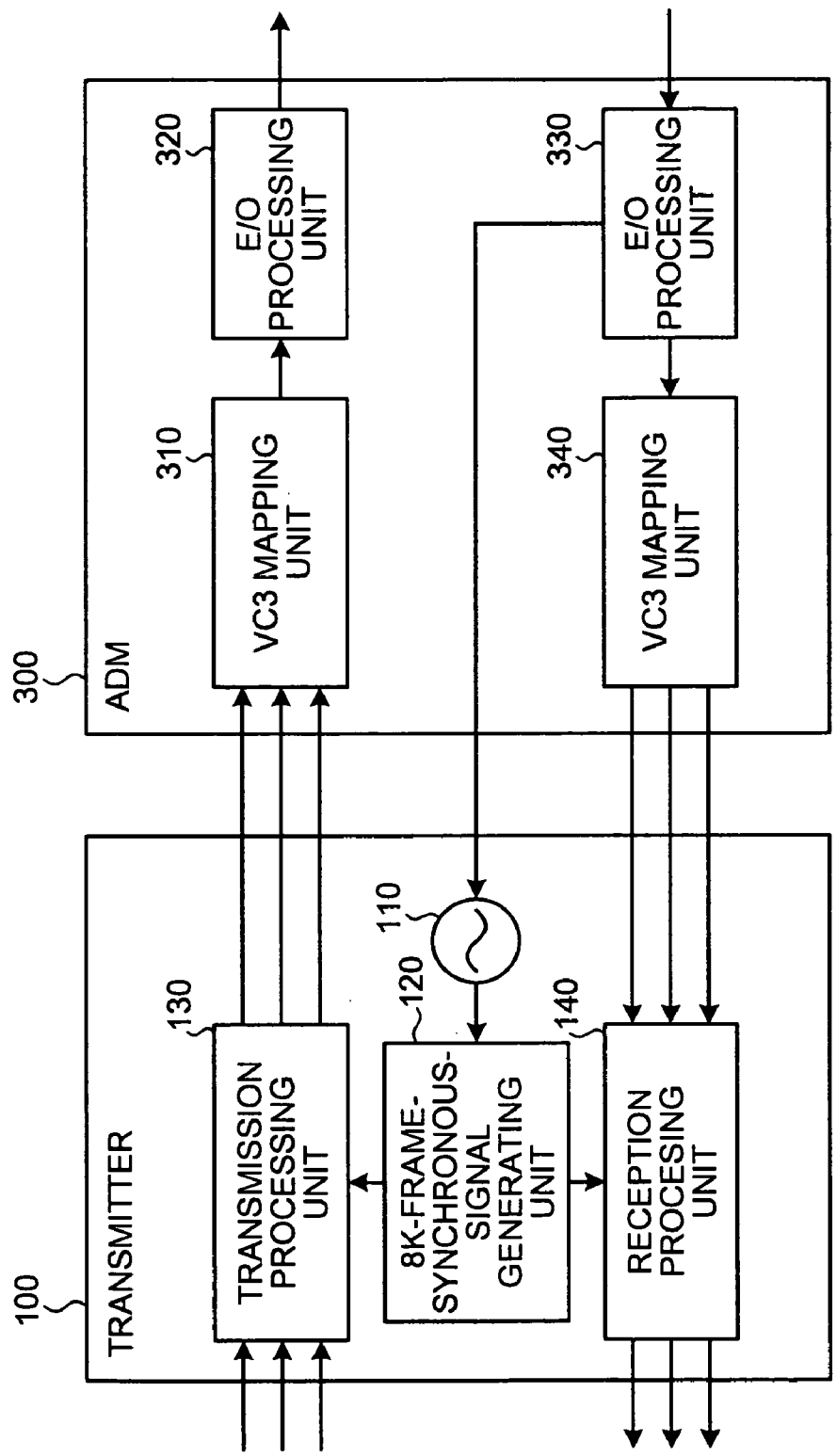
FIG. 2 is a functional block diagram of a transmitter and an ADM shown in FIG. 1.

FIG. 2 is a functional block diagram of the transmitter 100 and the ADM 300 shown in FIG. 1. Descriptions of the transmitter 200 and the ADM 400 are omitted because they have the same configurations as those of the transmitter 100 and the ADM 300.

The transmitter 100 includes a phase locked loop (PLL) 110, an 8K-hertz (Hz)-frame-synchronous-signal generating unit 120, a transmission processing unit 130, and a reception processing unit 140. The ADM 300 includes a virtual concatenation 3 (VC3) mapping unit 310, an electrical/optical (E/O) processing unit 320, an optical/electrical (O/E) processing unit 330, and a VC3 demapping unit 340.

The PLL 110 matches a frequency of an input signal and a frequency of an output signal. Thus, the PLL 110 passes standard synchronous signals input from the ADM 300 to the 8K-frame-synchronous-signal generating unit 120 without changing the frequency.

The 8K-frame-synchronous-signal generating unit 120 generates standard synchronous signals of 8 KHz (hereinafter, "8K synchronous signals"), based on the standard synchronous signals received from the PLL 110. The generated 8K synchronous signals are then passed to the transmission processing unit 130 and the reception processing unit 140.

Figure 3:
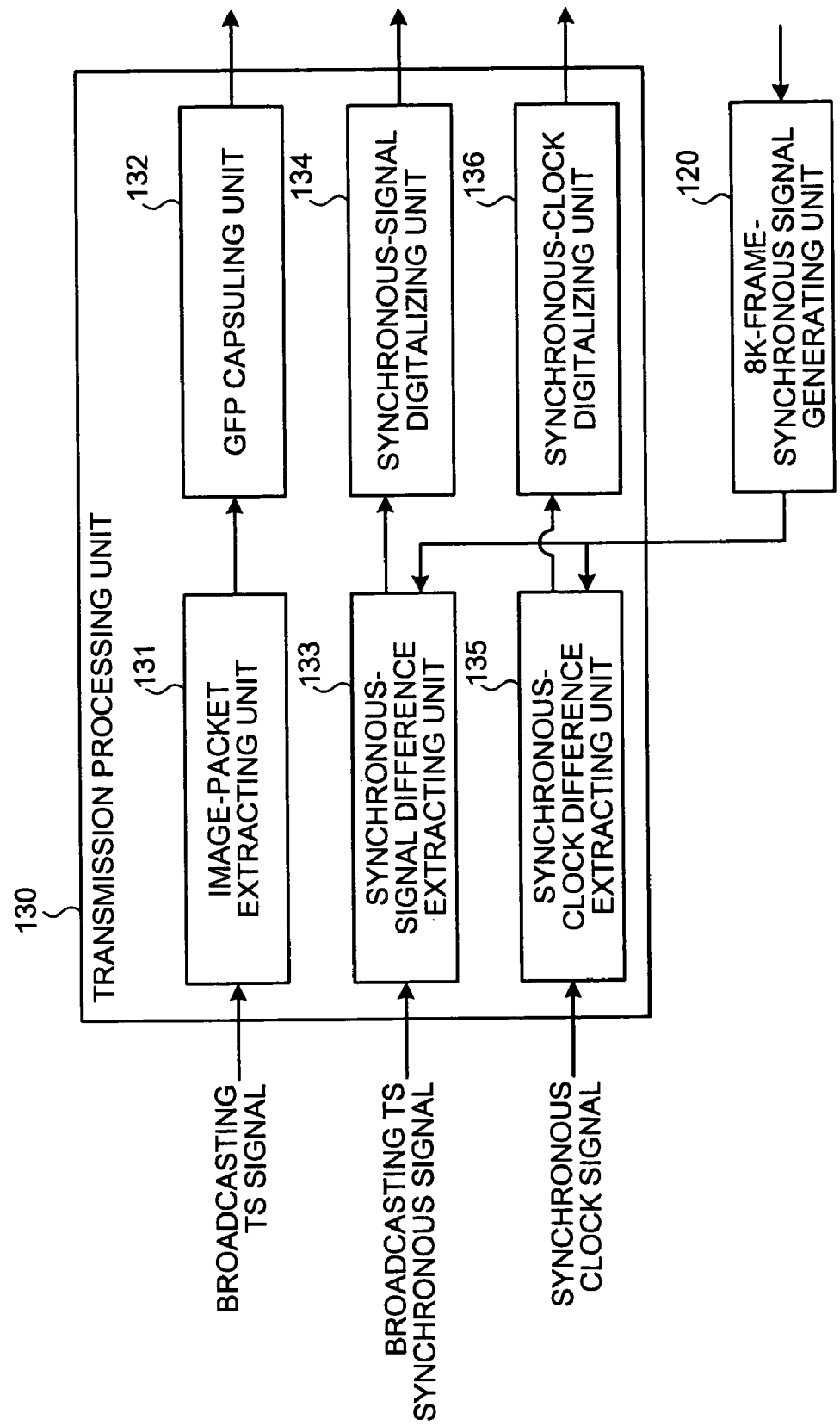
FIG. 3 is a functional block diagram of a transmission processing unit shown in FIG. 2.

FIG. 3 is a functional block diagram of the transmission processing unit 130 shown in FIG. 2. The transmission processing unit 130 includes an image packet extracting unit 131, a generic framing procedure (GFP) capsuling unit 132, a synchronous-signal-difference extracting unit 133, a synchronous-signal digitalizing unit 134, a synchronous clock-difference extracting unit 135, and a synchronous-clock digitalizing unit 136.

The image packet extracting unit 131 extracts an image packet from the broadcasting TS signals, and passes the extracted-image packet to the GFP capsuling unit 132. The GFP capsuling unit 132 capsules the image packet using a GFP capsuling method, and passes the capsuled image packet (hereinafter, "capsuled image data") to the ADM 300.

The synchronous-signal-difference extracting unit 133 acquires the broadcasting TS synchronous signals and the 8K synchronous signals, and extracts the differences between each of the broadcasting TS synchronous signals and each of the 8K synchronous signals. The synchronous-signal-difference extracting unit 133 then passes the extracted differences to the synchronous-signal digitalizing unit 1,34. The synchronous-signal digitalizing unit 134 digitalizes the differences, and passes the digitalized differences (hereinafter, "synchronous difference data") to the ADM 300.

Figure 4:
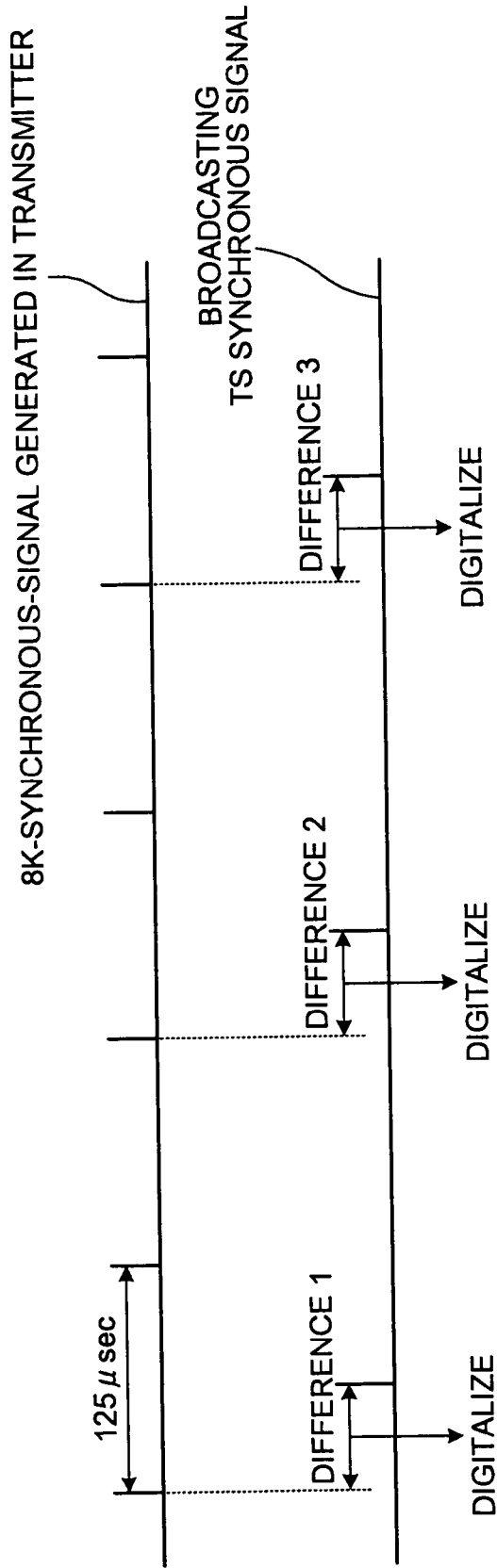
FIG. 4 describes how differences between broadcasting TS synchronous signals and 8K synchronous signals are extracted.

FIG. 4 describes how the differences between the broadcasting TS synchronous signals and the 8K synchronous signals are extracted. A counter circuit (not shown) of a predetermined high-frequency clock starts counting from a leading edge of an 8K synchronous signal of a cycle of 125μseconds. The counting stops when a leading edge of a broadcasting TS synchronous signal is generated. The counted value is the synchronous difference data. If a leading edge of a broadcasting TS synchronous signal is not generated within the 125μ cycle of the 8K synchronous signal, absence of broadcasting TS synchronous signal difference data is notified to the synchronous-signal-difference extracting unit 133. The absence can be recognized when a next leading edge of the 8K synchronous signal is detected while the counting is in progress. Alternatively, the absence can be recognized when a next leading edge of the 8K synchronous signal is detected, and the counter circuit is reset to start counting again.

Returning to FIG. 3, the synchronous clock-difference extracting unit 135 acquires the synchronous clock signals and the 8K synchronous signals, extracts differences between the signals, and passes the extracted differences to the synchronous-clock digitalizing unit 136. The synchronous-clock digitalizing unit 136 digitalizes the differences acquired from the synchronous clock-difference extracting unit 135, and passes the digitalized differences (hereinafter, "clock difference data") to the ADM 300.

Figure 5:
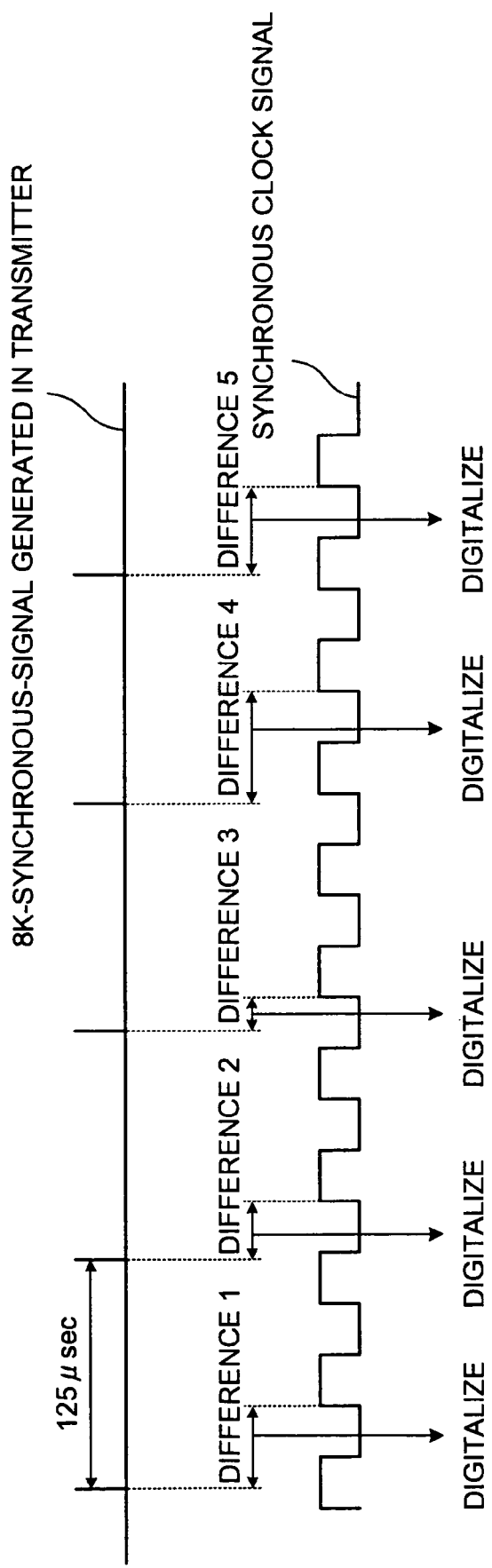
FIG. 5 describes how differences between synchronous clock signals and the 8K synchronous signals are extracted.

FIG. 5 describes how the differences between the synchronous clock signals and the 8K synchronous signals are extracted. The counter circuit of a predetermined high-frequency clock starts counting from a leading edge of an 8K synchronous signal of a cycle of 125μ seconds. The counting stops when a first leading edge of a synchronous clock signal is generated. The counted value is the clock difference data. If a leading edge of a synchronous clock signal is not generated within the 125μ cycle of the 8K synchronous signal, absence of synchronous-clock-signal difference data is notified to the synchronous clock-difference extracting unit 135. The absence can be recognized when a next leading edge of the 8K synchronous signal is detected while the counting is in progress. Alternatively, the absence can be recognized when a next leading edge of the 8K synchronous signal is detected, and then the counter circuit is reset to start counting again.

Returning to FIG. 2, the VC3 mapping unit 310 acquires the capsuled image data, the synchronous difference data, and the clock difference data from the transmission processing unit 130. The GFP is used for mapping data in a frame.

Figure 6:
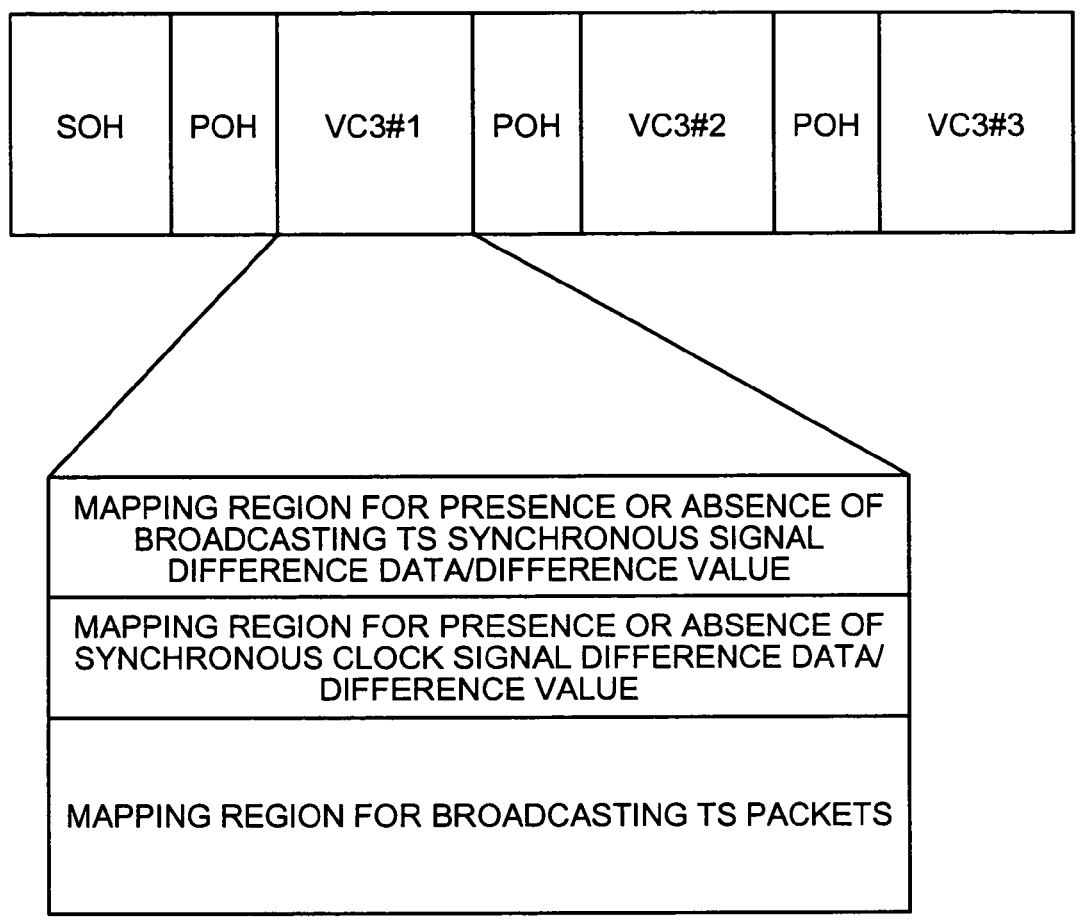
FIG. 6 is an example of a data structure mapped in a frame by a VC3 mapping unit.

FIG. 6 is an example of a data structure mapped in a frame by the VC3 mapping unit 310. The frame includes a section overhead (SOH), a path overhead (POH), a VC3#1, a VC3#2, and a VC3#3. The VC3#1, the VC3#2, and the VC3#3 each includes a mapping region for presence or absence of broadcasting TS synchronous signal difference data/difference value, a mapping region for presence or absence of synchronous-clock-signal difference data/difference value, and a mapping region for broadcasting TS packets.

The SOH is a region that stores data required for maintenance and operation of transmission path switching data. The POH is a region that stores data required for maintenance and operation of each unit segment of mapping regions. The mapping region for presence or absence of broadcasting TS synchronous signal difference data/difference value stores the synchronous difference data (the region includes a 16 bit region so that a counted value is input as a binary code). When there is no synchronous difference data, data informing absence of the broadcasting TS synchronous signal difference data is stored.

The mapping region for presence or absence of synchronous-clock-signal difference data/difference value stores the clock difference data (the region includes a 16 bit region so that a counted value is input as a binary code). When there is no clock difference data, data informing absence of the synchronous-clock-signal difference data is stored. The mapping region for broadcasting TS packets stores the capsuled image data.

Returning to FIG. 2, the E/O processing unit 320 acquires the frame in electrical signals from the VC3 mapping unit 310, converts the frame into optical signals, and transfers the frame in optical signals to the ADM 400 through the SDH synchronous network 50.

When the O/E processing unit 330 receives the frame in optical signals from the SDH synchronous network 50, the O/E processing unit 330 converts the frame into electrical signals, and passes the frame in electrical signals to the VC3 demapping unit 340. Upon receiving the standard synchronous signals, the O/E processing unit 330 passes the standard synchronous signals to the PLL 110.

The VC3 demapping unit 340 acquires the frame from the O/E processing unit 330, extracts the capsuled image data, the synchronous difference data, and the clock difference data from the frame, and passes the extracted data to the reception processing unit 140.

Figure 7:
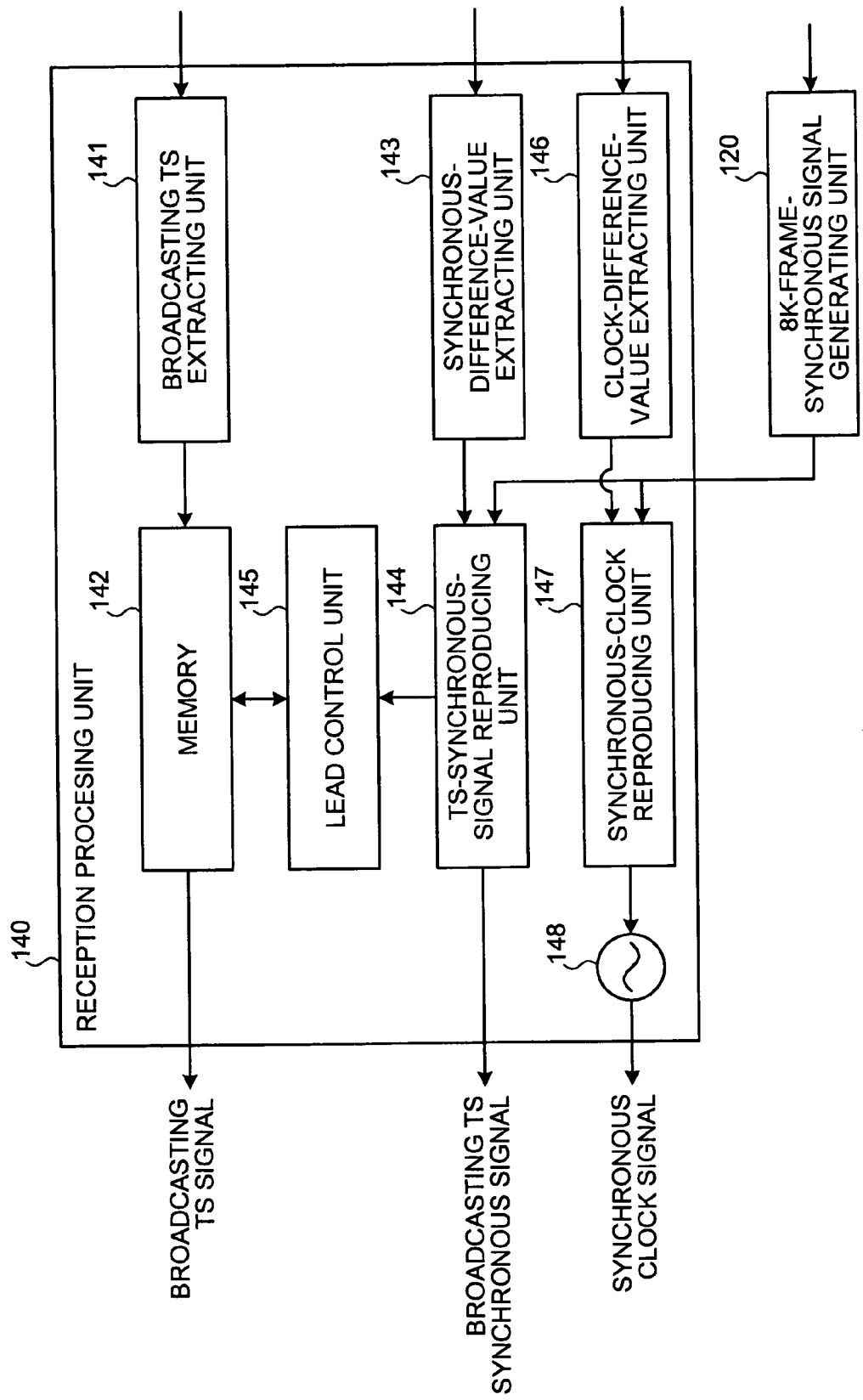
FIG. 7 is a functional block diagram of a reception processing unit shown in FIG. 2.

FIG. 7 is a functional block diagram of the reception processing unit 140. The reception processing unit 140 includes a broadcasting TS extracting unit 141, a memory 142, a synchronous-difference extracting unit 143, a TS-synchronous-signal reproducing unit 144, a lead control unit 145, a clock-difference extracting unit 146, a synchronous-clock reproducing unit 147, and a PLL 148.

The broadcasting TS extracting unit 141 acquires the capsuled image data from the ADM 300, extracts the image packet from the capsuled image data, and stores the image packet in the memory 142. The memory 142 is a storing unit that stores image packets.

The synchronous-difference extracting unit 143 acquires the synchronous difference data from the ADM 300, extracts the synchronous differences from the synchronous difference data, and passes the synchronous differences to the TS-synchronous-signal reproducing unit 144.

The TS-synchronous-signal reproducing unit 144 acquires the synchronous differences from the synchronous-difference extracting unit 143, and the 8K synchronous signals from the 8K-frame-synchronous-signal generating unit 120, respectively. Based on the acquired data, the TS-synchronous-signal reproducing unit 144 reproduces broadcasting TS synchronous signals equivalent to those of a source transmitter.

Figure 8:
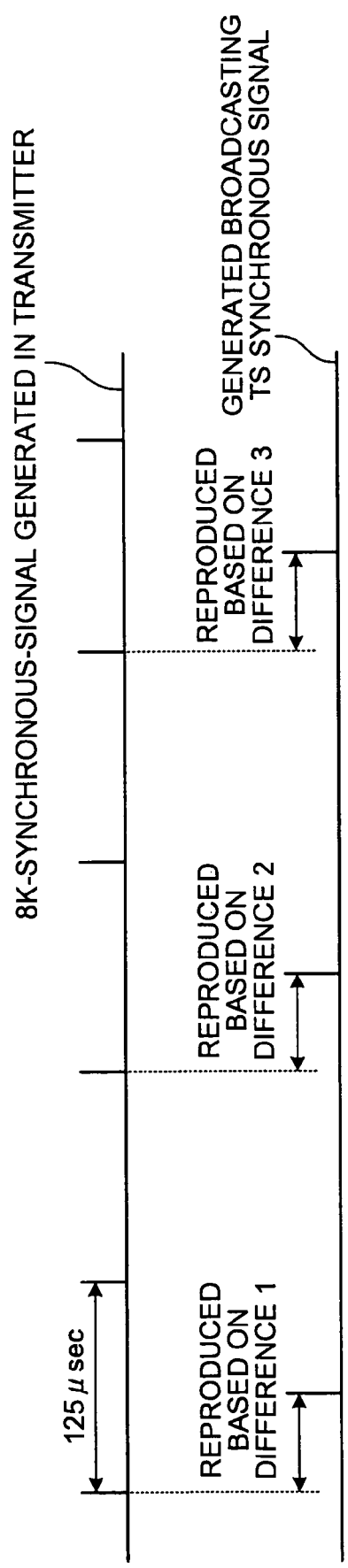
FIG. 8 describes how the broadcasting the TS synchronous signals are reproduced.

FIG. 8 describes how the broadcasting TS synchronous signals are reproduced. The counter circuit starts counting from a leading edge of an 8K synchronous signal. When a counted value reaches a point that equals the synchronous difference, the point becomes a leading edge of a broadcasting TS synchronous signal. By repeating such a processing, the TS-synchronous-signal reproducing unit 144 reproduces broadcasting TS synchronous signals. The TS-synchronous-signal reproducing unit 144 passes the reproduced broadcasting TS synchronous signals to the lead control unit 145 and a host computer (not shown).

Returning to FIG. 7, the lead control unit 145 passes the image packets stored in the memory 142 to the host computer, as broadcasting TS signals. The broadcasting TS signals include image data, and each image data includes a plurality of image packets. The lead control unit 145 controls a flow of the image packets to the host computer, so that a leading image packet in an image data synchronizes with a broadcasting TS synchronous signal received from the TS-synchronous-signal reproducing unit 144.

The clock-difference extracting unit 146 acquires the clock difference data from the ADM 300, extracts the clock differences from the clock difference data, and passes the clock differences to the synchronous-clock reproducing unit 147.

The synchronous-clock reproducing unit 147 acquires the clock differences from the clock-difference extracting unit 146, and the 8K synchronous signals from the 8K-frame-synchronous-signal generating unit 120, respectively. Based on the acquired data, the synchronous-clock reproducing unit 147 reproduces synchronous clock signals equivalent to those of the source transmitter.

Figure 9:
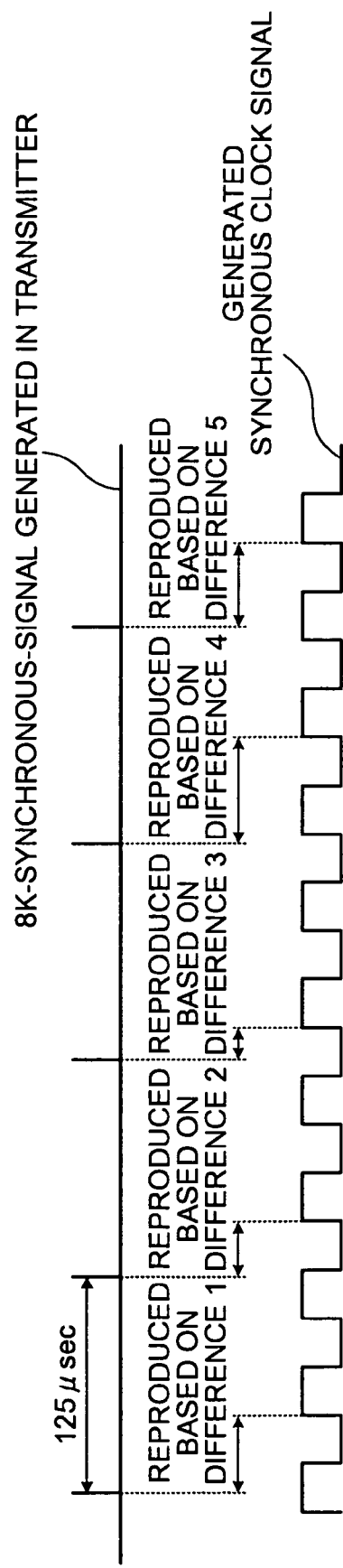
FIG. 9 describes how the synchronous clock signals are reproduced.

FIG. 9 describes how the synchronous clock signals are reproduced. The counter circuit starts counting from a leading edge of an 8K synchronous signal. When a counted value reaches a point that equals the clock difference, the point becomes a leading edge of a synchronous clock signal. By repeating such a processing, the synchronous-clock reproducing unit 147 reproduces synchronous clock signals. The synchronous-clock reproducing unit 147 passes the reproduced synchronous clock signals to the host computer through the PLL 148. A description of the PLL 148 is omitted here because it is the same as the PLL 110 shown in FIG. 2.

In the transmitter 100 according to the present embodiment, the GFP capsuling unit 132 generates the capsuled image data, the synchronous-signal digitalizing unit 134 generates the synchronous difference data, and the synchronous-clock digitalizing unit 136 generates the clock difference data. The transmitter 100 transmits such data to the transmitter 200 through the ADM 300.

In the transmitter 100, when a frame is received, the broadcasting TS extracting unit 141 extracts the broadcasting TS signals, the TS-synchronous-signal reproducing unit 144 reproduces broadcasting TS synchronous signals, and the synchronous-clock reproducing unit 147 reproduces synchronous clock signals.

Thus, cable signal transmission for terrestrial digital broadcasting can be realized by using existing general-purpose lines without difficulty. Specifically, terrestrial digital data can be transmitted without requiring advanced specifications, and without deteriorating image quality. Moreover, the terrestrial digital data can be precisely reproduced.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for transmitting terrestrial digital data that includes image data using a synchronous-optical-network system or a synchronous-digital-hierarchy system, the apparatus comprising:

a synchronous-difference calculating unit to receive a synchronous signal used in the synchronous-optical-network system or the synchronous-digital-hierarchy system, receive a first broadcasting transport stream synchronous signal that synchronizes with a starting point in each of the image data included in the terrestrial digital data, calculate a synchronous difference between the synchronous signal and the first broadcasting transport stream synchronous signal, and generate data that notifies an absence of a synchronous difference data if the calculated synchronous difference is not within a cycle of the synchronous signal; and a transmission processing unit to transmit the synchronous difference or the generated data that notifies of an absence of the synchronous difference data together with the terrestrial digital data to a destination.

2. The apparatus according to claim 1, further comprising:

a clock-difference calculating unit to calculate a clock difference between the synchronous signal and a first synchronous clock signal that is used at the destination for receiving and reproducing the terrestrial digital data, wherein the transmission processing unit further transmits the clock difference to the destination.

3. The apparatus according to claim 2, wherein the transmission processing unit capsules the image data, generates a frame including the capsulated image data, the synchronous difference, and the clock difference, and transmits the generated frame to the destination.

4. The apparatus according to claim 3, further comprising:
a reception processing unit to receive the frame; and
a reproduction processing unit to reproduce, when the frame is received, the terrestrial digital data based on the capsuled image data, the synchronous difference, the clock difference, and the synchronous signal.

5. The apparatus according to claim 4, wherein the reproduction processing unit includes:
an image-data extracting unit to extract the image data capsuled;
a synchronous-signal generating unit to generate a second broadcasting transport stream synchronous signal equivalent to the first broadcasting transport stream synchronous signal based on the synchronous difference and the synchronous signal; and
a synchronous-clock generating unit to generate a second synchronous clock signal equivalent to the first synchronous clock signal based on the clock difference and the synchronous signal.

6. A method of transmitting terrestrial digital data that includes image data using a synchronous-optical-network system or a synchronous-digital-hierarchy system, the method comprising:
receiving a synchronous signal used in the synchronous-optical-network system or the synchronous-digital-hierarchy system, and a first broadcasting transport stream synchronous signal that synchronizes with a starting point in each of the image data included in the terrestrial digital data;
calculating a synchronous difference between the synchronous signal and the first broadcasting transport stream synchronous signal;
generating data that notifies an absence of a synchronous difference data if the calculated synchronous difference is not within a cycle of the synchronous signal; and
transmitting the synchronous difference or the generated data that notifies the absence of the synchronous difference data together with the terrestrial digital data to a destination.

7. The method according to claim 6, further comprising:
calculating calculates a clock difference between the synchronous signal and a first synchronous clock signal that is used at the destination for receiving and reproducing the terrestrial digital data, wherein
the transmitting includes transmitting the clock difference to the destination.

8. The method according to claim 7, wherein the transmitting includes:
capsuling the image data;
generating a frame including the capsuled image data, the synchronous difference, and the clock difference; and
transmitting the generated frame to the destination.

9. The method according to claim 8, further comprising:
receiving the frame; and
reproducing, when the frame is received, the terrestrial digital data based on the capsulated image data, the synchronous difference, the clock difference, and the synchronous signal.

10. The method according to claim 9, wherein the reproducing includes:
extracting the capsuled image data;
generating a second broadcasting transport stream synchronous signal equivalent to the first broadcasting transport stream synchronous signal based on the synchronous difference and the synchronous signal; and
generating a second synchronous clock signal equivalent to the first synchronous clock signal based on the clock difference and the synchronous signal.

* * * * *